United States Patent [19]

Jewess

[11] Patent Number: 5,428,952
[45] Date of Patent: Jul. 4, 1995

[54] GEODESIC ENGINE MOUNT STRUCTURE

[75] Inventor: Gordon Jewess, San Diego, Calif.

[73] Assignee: Sundstrand Corporation, Rockford, Ill.

[21] Appl. No.: 904,893

[22] Filed: Jun. 25, 1992

Related U.S. Application Data

[63] Continuation of Ser. No. 414,756, Sep. 29, 1989, abandoned.

[51] Int. Cl.⁶ .................................................. F02G 1/00
[52] U.S. Cl. .................................................. 60/39.31
[58] Field of Search ........................................ 60/39.31

[56] References Cited

U.S. PATENT DOCUMENTS

| | | | |
|---|---|---|---|
| 2,410,450 | 11/1946 | Kroon | 60/39.31 |
| 2,718,756 | 9/1955 | McDowall | 60/39.31 |
| 2,738,647 | 3/1956 | Hill | 60/39.08 |
| 2,828,607 | 4/1958 | Johnson | 60/39.31 |
| 3,020,004 | 12/1962 | Blyth et al. | 60/39.31 |
| 3,352,114 | 11/1967 | Wilde et al. | 60/262 |
| 3,675,418 | 7/1972 | Lenkelt et al. | 60/39.32 |
| 3,750,983 | 8/1973 | Morris | 244/54 |
| 3,902,314 | 9/1975 | Straniti | 60/39.31 |
| 4,040,249 | 8/1977 | Kahle et al. | 60/39.31 |
| 4,266,741 | 5/1981 | Murphy | 244/54 |
| 4,326,682 | 4/1982 | Nightingale | 244/54 |
| 4,603,721 | 8/1986 | White | 244/54 |

OTHER PUBLICATIONS

*Flight*, Mar. 13, 1947, pp. a, b, c, d.

*Primary Examiner*—Timothy S. Thorpe
*Attorney, Agent, or Firm*—Wood, Phillips VanSanten Hoffman & Ertel

[57] ABSTRACT

The lack of torsional rigidity in the mounting of a turbine engine (10) to a transmission (12) in a power unit (14), (16) is avoided utilizing a mounting structure including a relatively small ring-like base (58), (60) connected to the transmission (12) and a relatively larger, ring-like base (66) connected to the engine shroud (32). A plurality of struts (68) extend between the bases (58), (60) and (66) and are configured to define a series of triangular and/or trapezoidal openings (76). The arrangement of the struts (68) and the openings (76) provides exceptional torsional rigidity.

6 Claims, 4 Drawing Sheets

GEODESIC ENGINE MOUNT STRUCTURE

This application is a continuation of application Ser. No. 414,756, filed Sep. 29, 1989 now abandoned.

FIELD OF THE INVENTION

This invention relates to the mounting of gas turbine engines.

BACKGROUND OF THE INVENTION

Many of the larger or more sophisticated aircraft in use today employ auxiliary power units (APU's) or the like which typically are relatively small gas turbines connected to drive hydraulic pumps and/or elastic generators through a transmission or the like. In a number of instances, the transmission is secured to the air frame with the pumps and the generators mounted to one side of the transmission, and the gas turbine mounted to the other.

While a number of factors come into play in considering the mounting of the turbine engine to the transmission, such as overhung moment, weight and volume of the mounting structure, and the like, another factor to be considered is the torsional ridigity of the mount. Lacking torsional rigidity, torsional stresses at the interface of the engine and the transmission may require designing unusually large and/or heavy parts to accommodate such stresses, and such designs are clearly not looked upon with favor in aircraft where weight and volume constraints are always present.

The present invention is directed to overcoming one or more of the above problems.

SUMMARY OF THE INVENTION

It is the principal object of the invention to provide a new and improved turbine driven power unit. More specifically, it is an object of the invention to provide such a power unit including an improved engine mounting structure.

An exemplary embodiment of the invention achieves the foregoing object in a structure including a gas turbine engine having a rotor, a transmission having a rotary input and adapted to drive a power producing unit such as a pump or a generator, and a shaft interconnecting the rotor and the rotary input. A plurality of rigid struts interconnect the engine and the transmission. The struts are arrayed about the shaft in non-parallel fashion and at substantial angles to each other to thereby provide a lightweight connection between the transmission and the engine which has substantial torsional rigidity by reason of the fact that the struts are angled with respect to one another.

In a preferred embodiment of the invention, the struts nominally lie in the surface of a frustocone.

Preferably, the engine includes a centrifugal radial outflow compressor wheel defining the rotor and a fixed compressor wheel shroud. The struts are connected to the shroud.

In a highly preferred embodiment, the struts and the shroud are an integral assembly.

The invention contemplates that the struts nominally define the envelope of a frustocone having its major base at the shroud.

In one aspect of the invention, the struts nominally define the envelope of a surface of revolution having opposed bases and extend between the bases and about the surface of revolution in a zigzag pattern.

Typically, one of the bases is a relatively small ring-like construction that is connected to the transmission concentric with the rotary input, and the other of the bases is a relatively larger ring-like structure connected to the shroud concentric with the compressor.

Other objects and advantages will become apparent from the following specification taken in connection with the accompanying drawings.

DESCRIPTION OF THE PREFERRED EMBODIMENT

Figure 1:
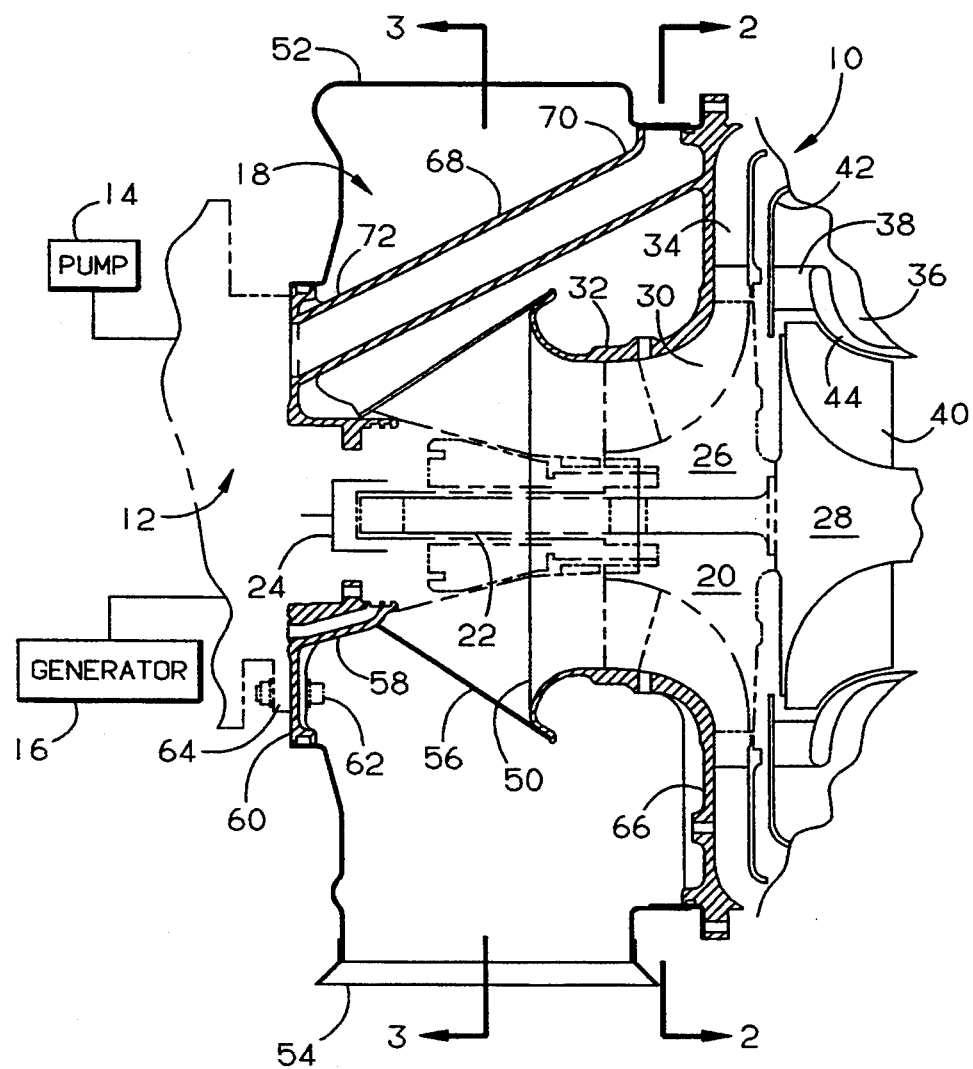
FIG. 1 is a sectional view of a power unit made according to the invention.

An exemplary embodiment of a power unit made according to the invention is illustrated in the drawings and with reference to FIG. 1 is seen to be made up of four major components. A first is a radial turbine engine, generally designated 10. A second is a transmission, shown schematically and generally designated 12, to which the engine 10 is mounted. A third component is a power generating means such as a hydraulic pump 14, or a generator 16, or both. The pump 14 and the generator 16 are driven by the turbine engine 10 through the transmission 12.

The fourth major component of the system is a mounting structure, generally designated 18, by which the engine 10 is mounted to the transmission 12.

The engine 10 includes a rotor 20 and an output shaft 22 which is coupled as an input to a rotary input shaft shown schematically at 24 and forming part of the transmission 12. The rotor 20 is made up of a compressor hub 26 and a turbine hub 28. The compressor hub 26 mounts a plurality of compressor blades 30 to define a rotary, radial outflow centrifugal compressor. The blades 30 are closely adjacent a fixed, compressor shroud 32 and discharge to a conventional diffuser 34 supported in part by the shroud 32.

Resulting compressed air is then provided to a combustor, only part of which is shown at 36, where it acts as the oxidant for fuel to be combusted. The resulting gases of combustion are passed by an annular nozzle 38 against a radial turbine wheel defined by the hub 28 and blades 40 thereon. The nozzle 38 includes a plurality of vanes supported between a front turbine shroud 42 and a rear turbine shroud 44.

The hubs 26 and 28 are linked together in any suitable fashion so that the resulting rotation of the turbine wheel 28, 40 drives the compressor 26, and, in addition, drives the shaft 22 to provide rotary power to the input shaft 24 of the transmission 12.

The shroud 32 terminates in a somewhat bell-shaped air inlet 50 which in turn is located in a plenum 52 having an inlet 54. A frustoconical screen or air filtering structure 56 extends from the inlet bell 50 to a ring-like structure 58 which also serves as one of two bases for mounting the engine 10 to the transmission 12. The ring-like structure 58 includes a radially outwardly extending, peripheral flange 60 which, by means of fasteners 62 or the like, may be secured to a similar flange 64 on the transmission 12 concentric to the shaft 22.

Figure 2:
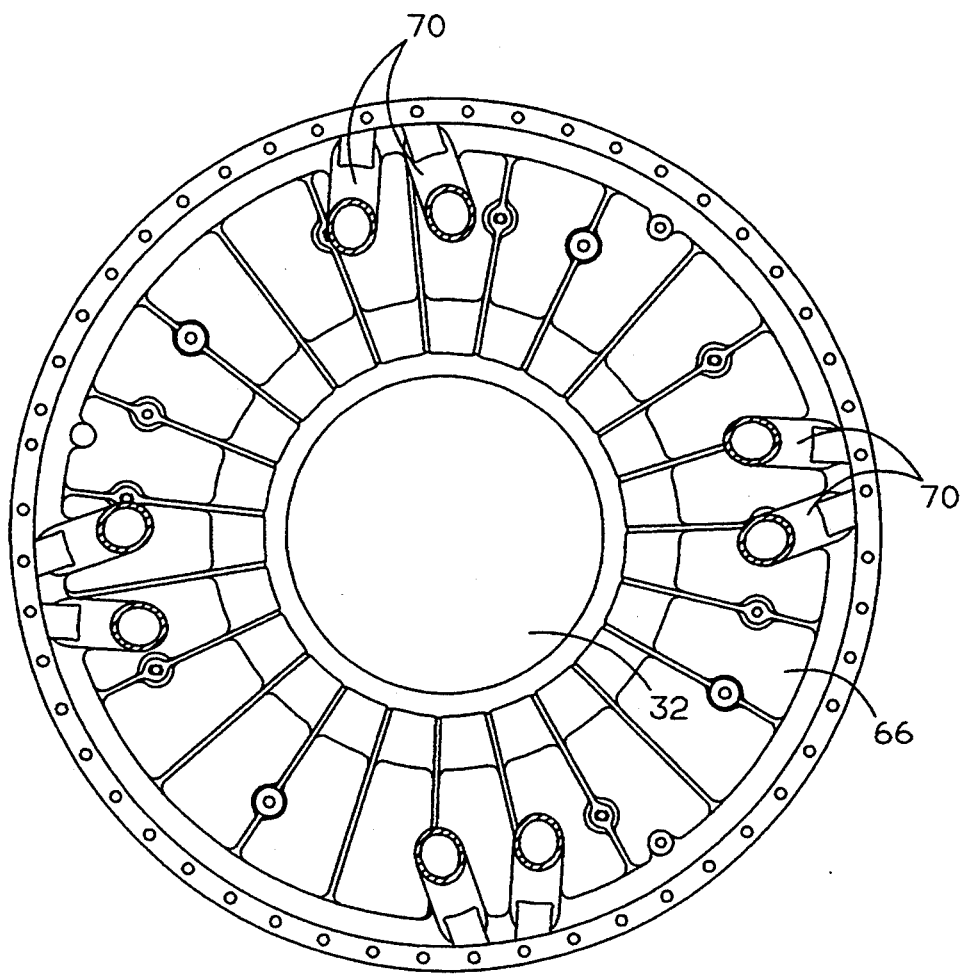
FIG. 2 is a sectional view taken approximately along the line 2—2 in FIG. 1.
Figure 3:
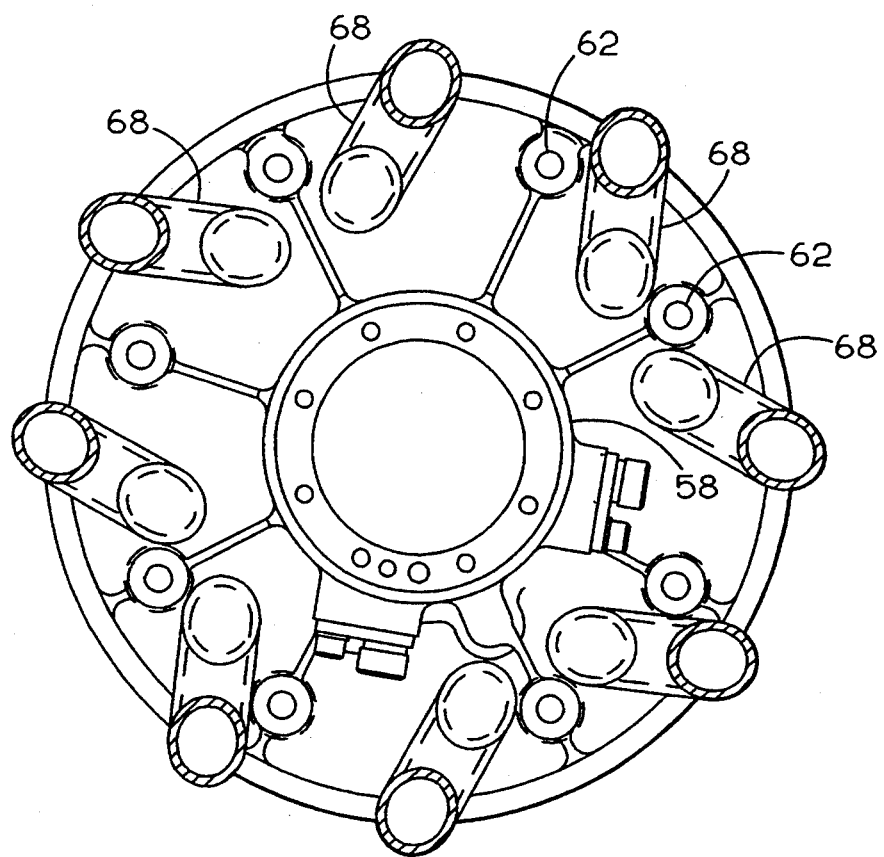
FIG. 3 is a sectional view taken approximately along the line 3—3 in FIG. 1.

A part 66 of the shroud 32 that extends generally radially outwardly acts as a second ring-like base in the mounting of the engine 10. A plurality of struts 68 (only one of which is shown in FIG. 1) extend between the shroud 32 at the flange 66 and the flange 60 on the ring-like structure 58 to mount the engine 10. As can be seen in FIGS. 2 and 3, an exemplary embodiment of the invention employs eight of the struts 68 and each is in the form of a tube of circular cross section.

It will also be observed from FIG. 1 that the struts 68 are integrally formed with the shrouds 32 and the ring-like structure 58, typically by casting.

Figure 4:
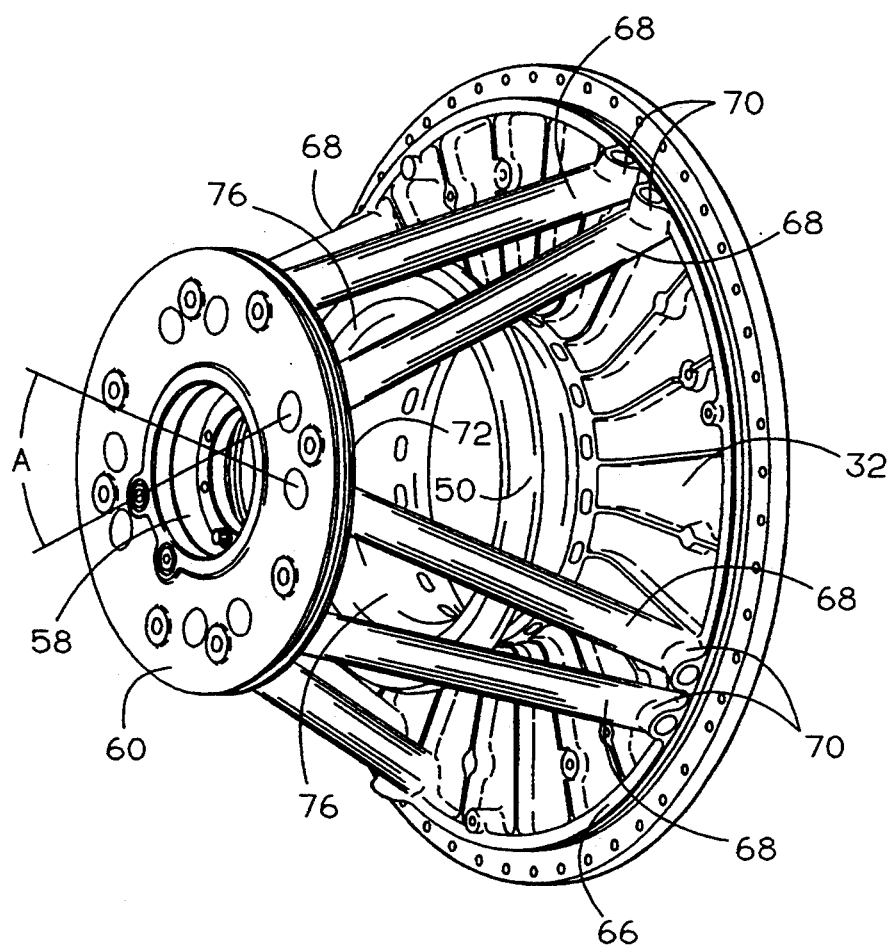
FIG. 4 is a perspective view of the mounting structure.

Each strut 68 has an end 70 joined to the shroud 32 and an opposed end 72 joined to the ring-like structure 58. The struts 68 are arrayed in a zigzag pattern along a surface of revolution about the rotational axis of the shaft 22 to be concentric therewith. In the preferred embodiment, the surface of revolution a frustocone and because the struts 68 are arranged in a zigzag fashion, adjacent struts are at a substantial angle with respect to one another. This angle is, for example, illustrated at A in FIG. 4. The angle A in FIG. 4 is shown at the ring-like structure 58, but it will be appreciated that a similar substantial angle will exist between adjacent ends 70 of the struts 68 at the shroud 32.

Viewed another way, the zigzag pattern of the struts 68 defines a series of openings between adjacent struts, which openings are shown at 76. The openings 76 may be considered to be triangular and/or trapezoidal and are defined by the flanges 60 and 66 as bases of a trapezoid with the minor bases and/or apexes of a triangle being where two ends 70 of the struts 68 or two ends 72 of the struts are close together or converging upon each other, as the case may be.

This structure defines what might be termed a geodesic engine mount and because of the fact that the substantial angle A exists between adjacent struts 68, the same has exceptional torsional rigidity. For example, if one were to attempt to rotate the flange 60, as viewed in FIG. 4 in the clockwise direction relative to the flange 66, four of the struts 68 would be placed in compression and the remaining four placed in tension with the former resisting twisting and the latter resisting any tendency of the flanges 60 and 66 to separate. For an oppositely directed attempt to rotate the flange 60 relative to the flange 66, the roles of the various struts would be reversed, but the same result would obtain.

From the foregoing, it will readily be appreciated that an engine mounting structure in a power unit made according to the invention provides exceptional torsional rigidity as is desired without resource to large, heavy components. The use of tubes spaced by the openings 76 minimizes weight while maximizing strength and the entire mounting system fits within the envelope of the turbine engine 10.

What is claimed is:

1. A turbine driven power unit comprising;
    a gas turbine including a rotary compressor having a rotational axis and a shroud therefor;
    a mechanical transmission for driving power generating equipment such as a pump or a generator and having a housing and a rotary input coaxial with, but spaced from said compressor;
    a connecting shaft on said axis extending between said rotary input and said compressor;
    a relatively small diameter ring-like base connected to said transmission concentric with said rotary input;
    a relatively larger ring-like base having a diameter substantially greater than that of said small ring-like base connected to said shroud and concentric with said compressor;
    a plurality of struts extending between said bases and configured to define a series of triangular and/or trapezoidal openings between said struts and said bases, alternating ones of said openings having their triangular apexes and/or minor trapezoidal bases at said relatively larger base, said struts being arrayed along a frustoconical surface of revolution concentric with said axis.

2. The turbine driven power unit of claim 1 wherein said struts and said relatively larger base are integral.

3. The turbine driven power unit of claim 1 wherein said struts and said relatively smaller base are integral.

4. The turbine driven power unit of claim 1 wherein said struts and both said ring-like bases are integral.

5. The turbine driven power unit of claim 2 wherein both said ring-like bases, said struts and said shroud are integral.

6. A gas driven power unit comprising:
    a gas turbine including a rotary compressor having a rotational axis and a shroud therefore;
    a mechanical transmission for driving power generating equipment such as a pump or a generator and having a housing and a rotary input coaxial with, but spaced from said compressor;
    a connecting shaft on said axis extending between said rotary input and said compressor;
    a relatively small diameter ring-like base connected to said transmission concentric with said rotary input;
    a relatively larger ring-like base having a diameter larger than said small diameter and connected to said shroud concentric with said compressor; and
    a frustoconical array of a plurality of struts extending between the integral with said bases and configured to define a series of triangular and/or trapezoidal openings between said struts and said bases, alternating ones of said openings having their triangular apexes and/or minor trapezoidal bases at said relatively larger base.

* * * * *